United States Patent
Vick

[11] 3,879,881
[45] Apr. 29, 1975

[54] FISHING LURE

[76] Inventor: Glendon Ralph Vick, 1205 Colville Rd., Victoria, British Columbia, Canada

[22] Filed: Feb. 26, 1974

[21] Appl. No.: 445,874

[52] U.S. Cl. .................. 43/41; 43/42.05; 43/42.23; 43/42.36; 43/42.5
[51] Int. Cl. ..................... A01k 85/00; A01k 97/04
[58] Field of Search ...... 43/41, 42.05, 42.23, 42.36, 43/42.5

[56] References Cited
UNITED STATES PATENTS

| | | | |
|---|---|---|---|
| 2,461,755 | 2/1949 | Miller | 43/41 X |
| 2,500,451 | 3/1950 | Codd | 43/41 |
| 2,791,056 | 5/1957 | Davis | 43/41 |
| 2,931,123 | 4/1960 | Jenson, Jr. | 43/41 |
| 2,939,241 | 6/1960 | Hicks | 43/41 |

*Primary Examiner*—Louis G. Mancene
*Assistant Examiner*—Daniel J. Leach
*Attorney, Agent, or Firm*—Carver and Company

[57] ABSTRACT

A fishing lure capable of a variety of motions dependent upon selection of a forward line guide. The lure has a body, an aft line guide, and a curved spoon at a forward end thereof. A hole or holes in the spoon provide a forward line guide and a central axis extends between the guides. The spoon has a concave forward face inclined to the axis and sloping rearwardly and upwardly. The upper edge of spoon has a deflector inclined forwardly to the spoon face. The deflector width is less than the spoon width and thus clearance openings are defined between the edges of the deflector and spoon. Water flowing up the spoon is deflected upwardly and laterally by the deflector, causing the lure to wobble.

10 Claims, 8 Drawing Figures

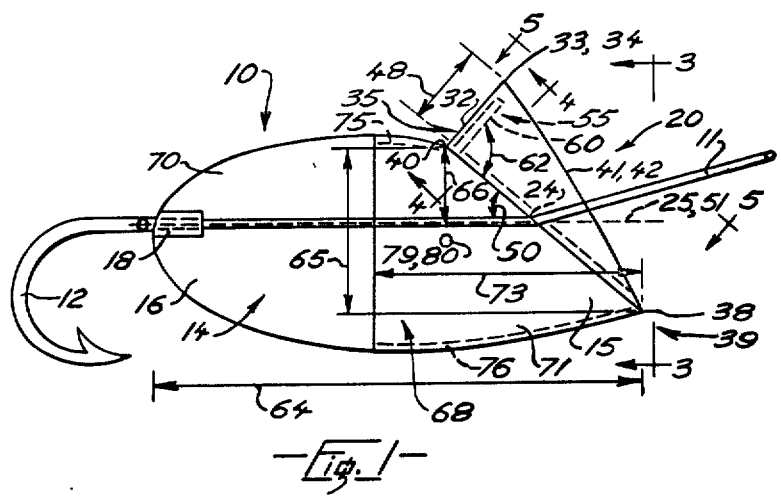
Fig. 1
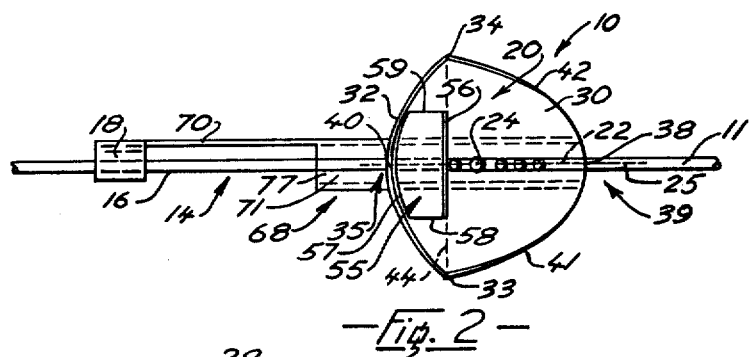
Fig. 2
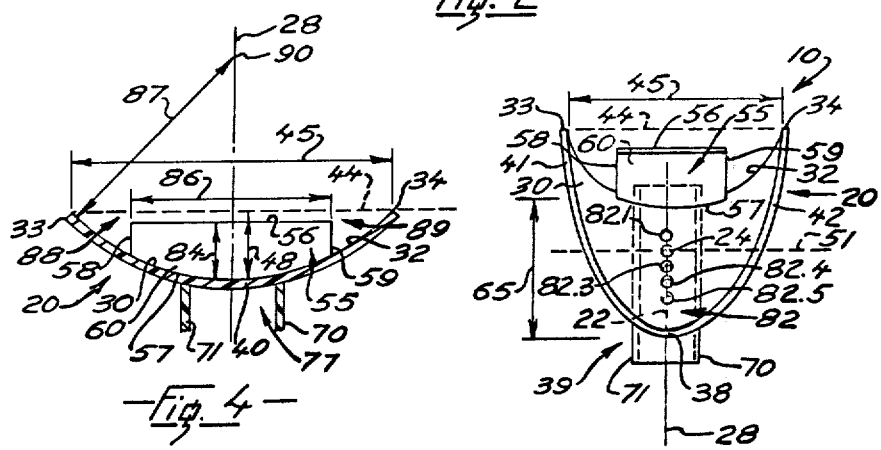
Fig. 4
Fig. 3

FISHING LURE

BACKGROUND OF THE INVENTION

1. Field of the Invention

The invention relates to a fishing lure for use when trolling, in particular a fishing lure that is easily adaptable to a variety of motions.

2. Prior Art

Many fishing lures are available, some of which are highly effective in attracting fish. Most lures are designed to perform a particular type of motion when trolling and thus commonly are attractive to only one species of fish. Thus when it is desired to fish different species a change of lures is required. For commercial fishermen this can involve a considerable expense, both in investment of many types of lures, some of which are fairly expensive, and in time required for removal and replacement of the lures.

SUMMARY OF THE INVENTION

The invention reduces difficulties of the prior art by providing a simple and relatively inexpensive fishing lure which is adaptable to a variety of bait. Further, with a simple rethreading of the line through the lure, the lure can be made to describe a variety of selected motions, which motions are attractive to different species of fish.

A fishing lure according to the invention has a body having forward and aft ends, the aft end having an aft line guide to accept a line, with an outer end of the line having a hook. The lure has a curved spoon secured to the forward end of the body, the spoon having a spoon central axis and a forward opening on the spoon axis to accept the line, thus serving as a forward line guide. A straight axis passing through the forward and aft line guides defines a central longitudinal axis of the lure to serve as a datum. The spoon has a concave forward face having a perimeter defined in part by an upper edge extending between spaced corners at an upper and aft end of the spoon, and a nose on the spoon central axis at a lower and forward end of the spoon. A straight line extending between the corners of the spoon defines a chord of the spoon and has a length defining spoon chord length. Spacing between the chord and the spoon central axis at the upper edge defines chord depth of the spoon. A portion of the spoon adjacent the central axis thereof is inclined at a rake angle to a horizontal plane containing the lure central axis so as to slope rearwardly and upwardly from the nose. A deflector is provided adjacent the upper edge of the spoon and has a forward face inclined forwardly and upwardly at a deflector angle to the spoon forward face on the spoon central axis. The deflector has spaced upper and lower edges and spaced side edges. Spacing between the deflector upper and lower edges on the spoon central axis defines deflector depth, and spacing between deflector side edges defines deflector width. The deflector width is less than the spoon chord length so as to define spaced clearance openings between the side edges of the deflector and the corners of the spoon. Thus a stream of water flowing past the lure from the forward to the aft end thereof is scooped up the forward face of the spoon and is deflected upwardly and laterally by the deflector forward face so that some water passes over the deflector and some water passes through the clearance openings at either side edge of the deflector. This causes the lure to wobble relative to the lure central longitudinal axis and further causes the lure to describe pre-determined motion dependent on position of the forward line guide. One example has a plurality of openings straddling the forward opening so as to provide a range of adjustment of motion of the lure when the line passes through different openings.

A detailed disclosure following, related to drawings, describes preferred embodiments of the invention, which however is capable of expression in structure other than that particularly described and illustrated.

DESCRIPTION OF THE DRAWINGS

FIG. 1 is a side elevation of a lure according to the invention, a hook and a portion of a line being shown, FIG. 2 is a top plan of the lure of FIG. 1, FIG. 3 is an end elevation of the lure of FIG. 1, as seen from line 3—3 of FIG. 1, FIG. 4 is a simplified section on line 4—4 of FIG. 1.

DETAILED DISCLOSURE

FIGS. 1 through 3

Figure 5:
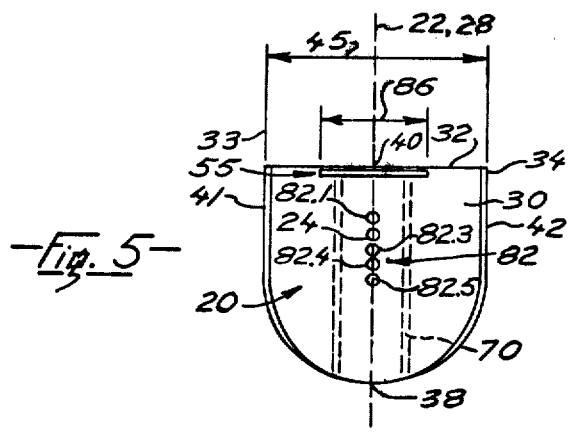
FIG. 5 is a simplified elevation of a spoon of the lure as seen from line 5—5 of FIG. 1.

A fishing lure 10 according to the invention is adapted for use with a fishing line 11 having a hook 12 at an outer end thereof. The lure has a body 14 having forward and aft ends 15 and 16, the aft end having an aft line guide 18 to accept the line 11.

The lure has a curved spoon 20 secured to the forward end 15 of the body, the spoon having a spoon central axis 22 and a forward hole 24 on the spoon axis to accept the line. The hole 24 serves as a forward line guide and a straight axis passing through the forward and aft line guides defines central longitudinal axis 25 of the lure, a portion of the axis between the line guides being coincident with the line when the line is taut. A vertical plane 28 contains the lure central axis 25, and the central axis of the spoon is within the plane 28 so that the spoon portion is disposed symmetrically about the plane 28 of the lure.

The spoon has a concave forward face 30 having a perimeter defined in part by an upper edge 32 extending between spaced corners 33 and 34 at an upper and aft end 35 of the spoon. The spoon has a nose 38 at a lower and forward end 39 of the spoon, the nose being disposed on the spoon central axis 22. The spoon central axis 22 thus extends between a spoon datum 40 at a midpoint of the upper edge 32 and the nose 38. The perimeter is further defined by spaced side edges 41 and 42 extending forwardly and downwardly from the corners 33 and 34 respectively to the nose 38, thus defining a shield-shaped portion as shown.

A chord 44 of the spoon is defined by a straight line (shown broken) extending between the corners 33 and 34 of the spoon, the line having a length 45 defining spoon chord length. Spacing between the chord 44 and the spoon datum 40 defines chord depth 48, best seen in FIGS. 1 and 4. A portion of the spoon adjacent the central axis 22 is inclined at a rake angle 50 (FIG. 1 only) to a horizontal plane 51 containing the lure central axis 25. Thus the spoon central axis 22 slopes rearwardly and upwardly from the nose 38 to the spoon datum 40, as seen in FIG. 1.

A deflector 55 is provided adjacent the upper edge 32 of the spoon and has spaced upper and lower edges 56 and 57, and spaced side edges 58 and 59 respectively. The deflector is a plane, generally rectangular sheet and has a forward face 60 inclined forwardly and upwardly at a deflector angle 62 to the spoon forward face 30, best seen in FIG. 1. The lure has an overall length 64 defined as spacing between the aft line guide 18 and the nose 38 measured parallel to the axis 25. The lure has a depth 65 defined as spacing between the lure datum 40 and the nose 38 within the central plane 28, and a datum/centreline spacing 66, both being measured normally to the central axis 25.

Figure 6:
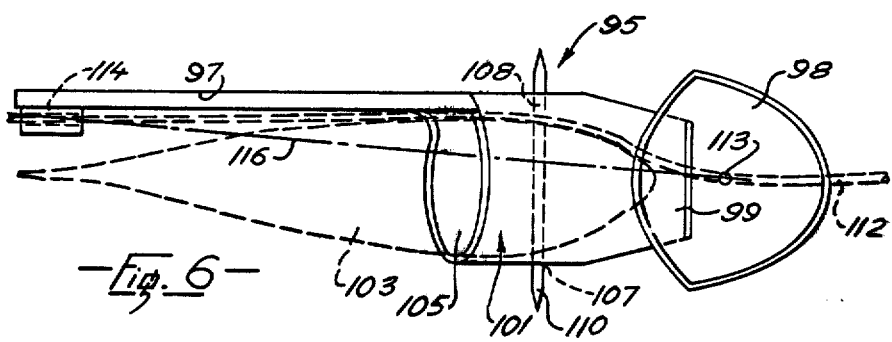
FIG. 6 is a simplified top plan of an alternative fishing lure having a head stall to accept bait, the bait being shown in broken outline.

The lure body has a means to retain bait, namely a head stall 68 adjacent the forward end and positioned aft of the spoon. One wall 70 of the head stall is the forward end of the lure body, and an opposite wall 71 having a length 73 shorter than the body is spaced from the first wall. The walls are plane and parallel to each other and are connected by upper and lower connecting walls 75 and 76, the walls defining a closed rectangular sectioned cavity 77 to accept bait (not shown). The walls 70 and 71 have generally aligned openings 79 and 80, respectively, the openings permitting insertion of a stake therethrough and through bait inserted between the walls, so as to retain the bait in the head stall. The bait and stake are not shown in FIG. 1 but equivalents are shown in FIG. 6, as will be described. The walls 70 and 71 are spaced symmetrically about the plane 28, and are thus spaced symmetrically about the opening 24 and permit central threading of the line therethrough. The line is shown in a position in FIG. 1 assuming no interference from the bait, however in practice the bait would tend to interfere with the line and distort the line from the straight path as shown.

The spoon has a plurality of holes 82 on the central axis 72, the plurality of holes straddling the forward hole 24 and providing a range of adjustment of motion of the lure as will be described.

The plurality of holes 82 includes a first hole 82.1 spaced above the hole 24, and third, fourth and fifth holes 82.3 through 82.5 respectively are spaced downwards from the hole 24.

FIGS. 4 and 5

As best seen in FIG. 4, spacing between the deflector upper and lower edges 56 and 57 on the spoon central axis 22 defines deflector depth 84. Spacing between the deflector side edges 58 and 59 defines deflector width 86. The side edges are generally straight and disposed normally to the upper edge 56, and the deflector is spaced symmetrically relative to the lure central axis 28. The deflector width is less than the chord length 45 so as to define a pair of spaced clearance openings 88 and 89 between the side edges of the deflector and the corners 33 and 34 of the spoon. The clearance openings are of particular importance and function as will be described. The deflector width 86 is approximately one-half of the spoon chord length 45 so that the clearance openings 88 and 89 are generally triangular shaped. The depth 84 of the deflector has a value of between the chord depth 48 and one-half of the chord depth. The spoon forward face 30 has a radius 87, centre 90 of which is on the vertical plane 28 so that the spoon forward face 30 is disposed symmetrically relative to the plane 28.

Table I itemizes important parameters of lures that have been found satisfactory for trolling for cohoe or chinook Salmon. The sizes listed in Examples A and B represent approximate upper and lower limits for the above species. The size of lure for fishing in a particular area is selected to approximate the size of herring or other bait fish in that area. Other species of fish are attracted to the lure by a change in line threading, hook weight and bait weight as will be described.

TABLE 1

| Parameter | Example A | Example B |
| --- | --- | --- |
| Overall length 64 | 2⅝ inch | 1⅝ inch |
| Lure depth 65 | ⅞ inch | 11/16 inch |
| Centreline/datum spacing 66 | ⅝ inch | 9/32 inch |
| Chord length 45 | 1 3/16 inch | 13/16 inch |
| Chord depth 48 | ⅜ inch | ¼ inch |
| Deflector depth 84 | 5/16 inch | 3/16 inch |
| Deflector width 86 | 19/32 inch | 13/32 inch |
| Spoon face radius 87 | 11/16 inch | 15/32 inch |
| Rake angle 50 | 40 degrees | 40 degrees |
| Deflector angle 62 | 90 degrees | 90 degrees |

Clearly there are ranges of values of the parameters listed above, and it has found that it is possible to specify some of the parameters by ratio. A ratio of chord length 45 to chord length 48 is typically between 3:1 and 5:1. Typical minima for chord length and depth would be a minimum chord depth 48 of one-eighth inch and a corresponding minimum chord length of one-half inch. Typical maxima would be a maximum chord depth 48 of three-eighths inch and a maximum chord length 45 of 1¼ inches.

A ratio of deflector width 86 to chord length 45 is between 3:8 and 5:8. The deflector angle can be between 75° and 90°, and the rake angle can be between 35° and 45°. The lure shown is fabricated from relatively stiff sheet plastic material having a thickness of approximately 1/32 inches, however other materials and sheet thickness can be selected. Also the lure can be injection moulded in which case wall thickness can vary as required.

OPERATION

The operation of the lure is similar to some prior art lures. The line 11 is threaded through the forward and aft line guides so that the hook 12 at an outer end thereof engages the aft line guide 18. Alternatively a stop means (not shown) can be provided on the line so that the hook is clear of the aft line guide. Thus the hook is not tied directly to the lure and thus had advantages as it allows a larger or smaller hook to be easily attached by fishermen.

The motion of the lure is dependent upon relative weights of the hook 12, the bait (FIG. 6), and the lure 10, the trolling speed and also the particular hole of the forward line guide through which the line is passed. When the lure passes through the water, a stream of water flowing past the lure from the forward to the aft end thereof is scooped up the forward face 30 of the spoon and is deflected upwardly and laterally by the deflector 55. Thus some water passes over the deflector and some water passes through the clearance openings 88 and 98 on either side of the deflector, causing the lure to wobble relative to the lure central axis.

As stated above motion of the lure is dependent upon which hole of the plurality 82 the line passes through. For example, consider a trolling speed of 2½ knots.

When the line passes through the first hole 82.1, and a medium weight hook is used the tail wiggles whilst the lure followed a generally straight line. This action tends to attract large chinook salmon. When the line passes through the second hole of the spoon, the main hole 24, the lure wiggles and simultaneously describes half rolls below horizontally aligned mid-postions spaced about 18 inches on each side of a mean line of travel of the line. At each uppermost position the lure pauses and only the tail will move back and forth, then the lure swings back through the lower position to the opposite side. This action tends to attract large cohoe salmon as it is moving faster than the first action. With a heavier hook and line passing through the hole 24 the lure describes the same motion as when the line was passed through the first hole with a lighter hook. When the line passes through the third hole 82.3, using the medium weight hook, the lure completes consecutive rolls of about three feet in diameter, wiggling throughout. This action tends to attract smaller cohoe and pink salmon. When the line passes through the fourth hole using the medium weight hook the speed of the role is increased at a constant trolling speed.

The action of the lure can be further changed by varying trolling speed such that, for a change in trolling speed with constant line position, there is a change in motion equivalent to changing line position. This will permit a sportsman using a small hook to troll slowly attaining a similar action as a commercial troller who uses a large hook and trolls faster. Generally speaking to attain similar motions an increase in hook weight requires rethreading the line through a hole closer to the nose 38. Thus commercial fishermen can fish for a variety of fish simultaneously by using some lures with the lines running through the first or second holes and attaining slow actions which attracts larger salmon, and also on other lures using lines passing through the fourth or fifth holes and obtaining faster actions to attract smaller salmon.

When a fish is hooked, the bait or lure travels forward on the line as fish pulls backward, due to angle of the aft face of the spoon. This is an advantage particularly to commercial fishermen because often the bait is not removed from the lure which removes necessity of changing the bait every time a fish is caught. Further the lure can be withdrawn from the fish and hook thus facilitating removal of the hook from the fish. A further advantage is that tension of the line urges the hook against the line, and holds the hook in the correct attitude relative to the lure so that only one hook is needed.

ALTERNATIVES AND EQUIVALENTS

FIG. 6

An alternative lure 95 has a body 97, a spoon 98 and deflector 99 similar to the lure 10 of FIG. 1. The forward end of the body has head stall 101 adapted to retain the head of a fish or strip bait 103, shown in broken outline. The head stall has a generally cylindrical-sectioned cavity 105 to accept the bait, the sidewalls of the lure having opposed openings 107 and 108 to accept a stake 110 passing through the bait. In such an arrangement a portion of line 112, shown in a broken line, passes through a forward hole 113 and around the bait as shown, and leaving the lure through an aft line guide 114. In such an arrangement it is seen that an axis 116 passing through the forward and aft openings is not within a central vertical plane of the lure. Thus the lure is somewhat assymmetrical, however the assymmetry does not have a deleterious effect on the performance. The headstall 101 is thus equivalent to the headstall 68 of FIG. 1 but has provision to accept a whole fish for particular types of fishing. Sizes and dimensions relating to the spoon and deflector will be varied slightly to compensate for heavier weight of the fish bait.

Figure 7:
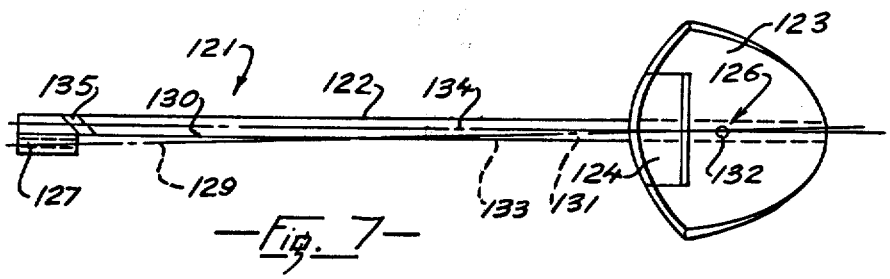
FIG. 7 is a top plan of a further alternative lure.
Figure 8:
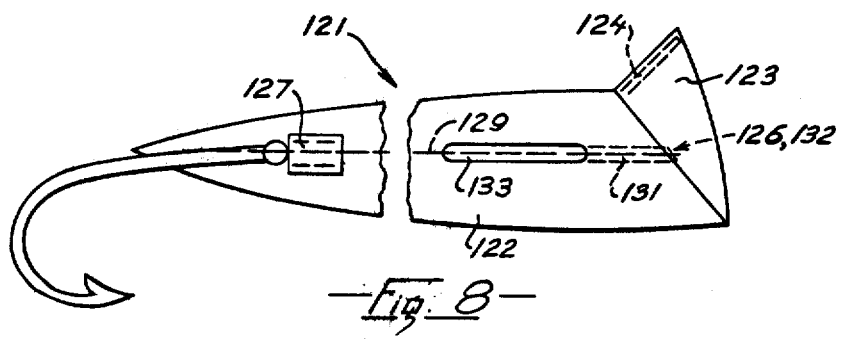
FIG. 8 is a fragmented side elevation of the lure of FIG. 7.

FIGS. 7 and 8

A further alternative lure 121 has a body 122, a spoon 123 at a forward end thereof and a deflector 124 secured to the spoon, all of which are similar to the lure 10 of FIG. 1. The body has a forward and aft line guides 126 and 127, and a straight axis passing through the forward and aft guides defines central axis 129 of the lure.

The forward guide 126 has a passage 131 extending through the forward portion of the body from a forward opening 132 on the spoon 123 to an aft opening 133 in the body 122. As can be seen in FIG. 7 the passage 131 is not aligned with the axis 129, the axis passing through the forward opening 132. The axis 129 is inclined at an angle 130 (about 4 or 5 degrees) to a centreline 134 of the body 122, the forward opening 132 being on the centreline of the body. Thus a fishing line (not shown) passes from the opening 132, along the passage 131, out of the opening 133 and smoothly alongside the body 122 to the aft line guide. An alternative aft line guide is a further inclined passage 135 through which the line can be threaded. The lure 127 is thus equivalent to the lure 95 and is used in cases where fish are to be attracted by a moving object and no bait is required.

The lure 121 is the most inexpensive lure of the invention and can be made attractive to fish by providing highly reflective or brightly colored surfaces on the body. This particular lure is shown with one forward hole only, for economy and simplicity, however further openings (not shown) could be provided in the spoon, which openings can connect with the opening 133.

I claim:

1. A fishing lure for use with a fishing line having a hook at an outer end thereof, the lure having:
   a. a body having forward and aft ends, the aft end having an aft line guide to accept the line,
   b. a curved spoon secured to the forward end of the body portion, the spoon having a spoon central axis and a forward hole on the spoon axis to accept the line serving as a forward line guide, a straight axis passing through the forward and aft line guides defining central longitudinal axis of the lure; the spoon having a concave forward face having a perimeter defined in part by an upper edge extending between spaced corners at an upper and aft end of the spoon, and a nose on the spoon central axis at a lower and forward end of the spoon, a straight line extending between the corners of the spoon defining a chord of the spoon and having a length defining spoon chord length, spacing between the chord and the spoon central axis at the upper edge defining chord depth of the spoon; a portion of the spoon adjacent the central axis thereof being inclined at a rake angle to a horizontal plane containing the lure central longitudinal axis so as to slope rearwardly and upwardly from the nose,
   c. a deflector having spaced upper and lower edges and spaced side edges provided adjacent the upper edge of the spoon, the deflector having a forward face inclined forwardly and upwardly at a deflector angle to the spoon forward face on the spoon central axis, spacing between the deflector upper and lower edges in a vertical plane containing the spoon central axis defining deflector depth, and spacing between the deflector side edges defining deflector width, the deflector width being less than the spoon chord length so as to define a pair of spaced clearance openings between the side edges of the deflector and the corners of the spoon, so that a stream of water flowing past the lure from the forward to the aft end thereof is scooped up the forward face of the spoon and is deflected upwardly and laterally by the deflector forward face so that some water passes over the deflector and some water passes through the clearance openings at either side edge of the deflector, causing the lure to wobble relative to the lure central longitudinal axis.

2. A lure as claimed in claim 1 in which the central axis of the spoon is within a vertical plane containing the lure central axis so that the spoon is disposed symmetrically about the longitudinal axis of the lure.

3. A lure as claimed in claim 1 in which the spoon has a pair of spaced side edges extending downwardly from the corners and curving symmetrically inwardly to the nose.

4. A lure as claimed in claim 1 in which the deflector is spaced symmetrically relative to the central longitudinal axis of the lure and has a deflector depth no greater than chord depth.

5. A lure as claimed in claim 1 in which a ratio of deflector width to chord length is between 3:8 and 5:8.

6. A lure as claimed in claim 1 in which the spoon has a plurality of additional holes on the central axis thereof, the plurality of holes straddling the forward hole and providing a range of adjustment of motion of the lure.

7. A lure as claimed in claim 1 in which the deflector angle is no greater than 90° and the rake angle is between 35° and 45°.

8. A lure as claimed in claim 7 in which the deflector angle is between 90° and 75° and the rake angle is 40°.

9. A lure as claimed in claim 1 in which the lure has a head stall serving as a means to retain bait, the head stall having a pair of spaced side walls, one wall extending to the aft end serving as the lure body, and other wall having a length sufficient to form an aft facing cavity to accept bait, the side walls having generally aligned openings to permit insertion of a stake therethrough and through bait fitting in the cavity so as to retain the bait in the head stall.

10. A lure as claimed in claim 1 in which a ratio of chord length to chord depth is between 3:1 and 5:1.

* * * * *